United States Patent Office 3,348,646
Patented Oct. 24, 1967

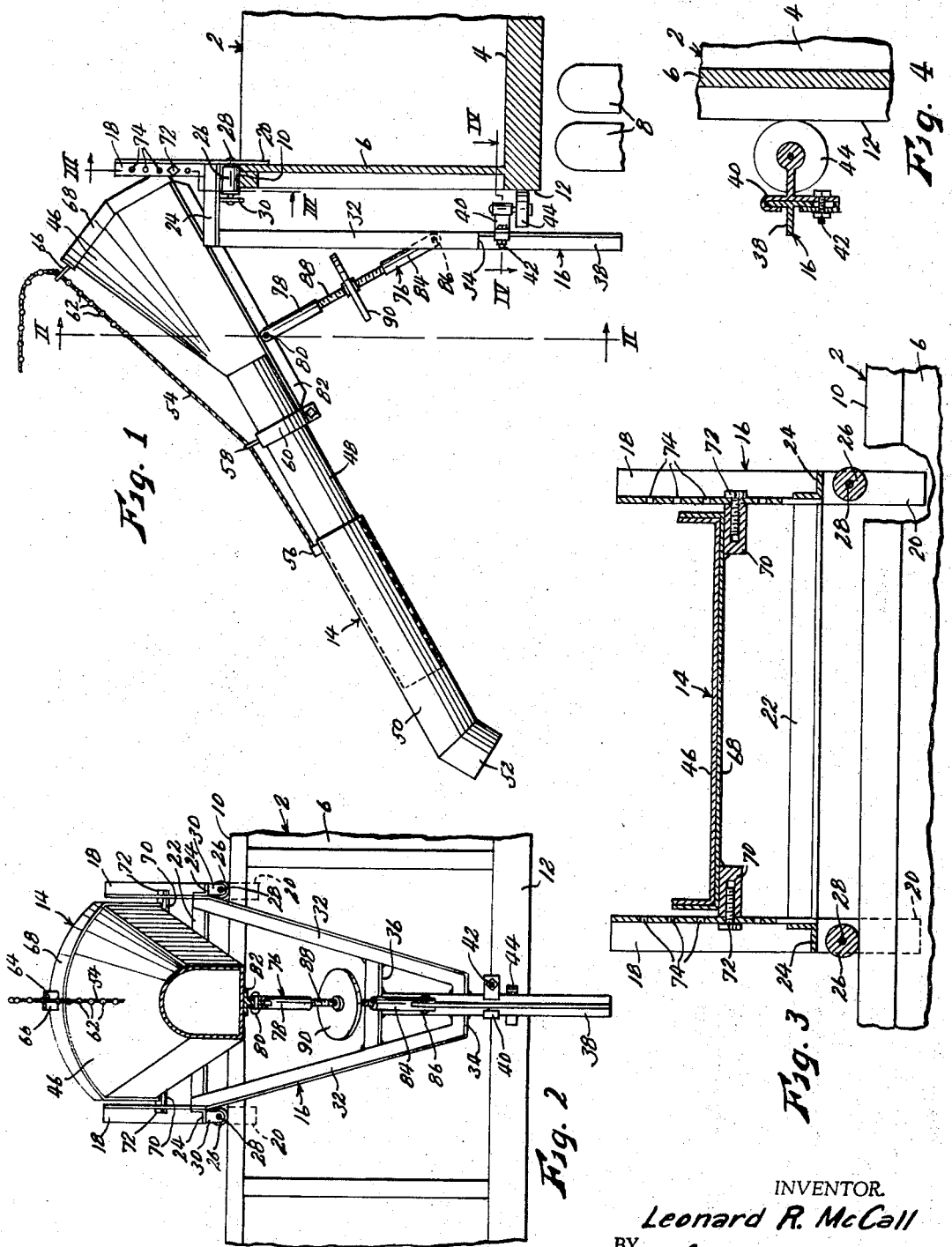

3,348,646
TRUCK UNLOADING CHUTE
Leonard McCall, Rte. 1, Golden City, Mo. 64748
Filed May 3, 1966, Ser. No. 547,371
1 Claim (Cl. 193—5)

ABSTRACT OF THE DISCLOSURE

This application discloses a device for unloading the contents of a truck bed and depositing them accurately at a point spaced apart from said truck bed. Said device includes a frame adapted to be mounted on the upper edge of a side wall of the truck bed, so as to be movable along said side wall, an open-ended chute pivoted at its upper end in said frame for vertical pivotal movement, and means for adjusting both the angle of inclination and the effective length of said chute.

This invention relates to new and useful improvements in devices for assisting in the unloading of material from truck bodies, and has particular reference to devices adapted to convey said material to positions comparatively remote from the truck itself and to deposit it accurately in quite small receptacles. The device has been developed primarily for use in transferring seeds and fertilizer from trucks used to transport them, to the appropriate hoppers or other containers of automatic planting machines, but it will be readily seen that said device has many other usages and applications.

The principal objects of the present invention is the provision of a truck unloading device consisting generally of an elongated chute adapted to be mounted easily and rapidly on the bed of nearly any common truck, in such a position that one end thereof is conveniently located for a workman standing in the truck bed to shovel or otherwise deposit the truck bed contents therein, and the other end of which extends away from said truck bed to be disposed above a receptacle to which it is desired to transfer the material.

Another object is the provision of a device of the character described having means whereby the chute may be easily and conveniently moved relative to the truck bed, so that the inlet end of said chute may be positioned for convenient reception therein of material from any part of said truck bed.

A further object is the provision of a device of the character described having means for adjusting both the angle of inclination of said chute, and also the degree of extension of said chute from the truck, both with the purpose of positioning the discharge end of said chute accurately over the receptacle in which material is to be deposited, without requiring tediously accurate positioning of the truck itself.

Other objects are simplicity and economy of construction, efficiency and dependability of operation, and adaptability for use in a wide variety of applications.

With these objects in view, as well as other objects which will appear in the course of the specification, reference will be had to the accompanying drawing, wherein:

FIG. 1 is a fragmentary transverse vertical sectional view of the bed portion of a truck, showing a truck unloading chute embodying the present invention mounted operatively thereon, FIG. 2 is a fragmentary sectional view taken on line II—II of FIG. 1, FIG. 3 is an enlarged fragmentary sectional view taken on line III—III of FIG. 1, and FIG. 4 is a fragmentary sectional view taken on line IV—IV of FIG. 1.

Like reference numerals apply to similar parts throughout the several views, and the numeral 2 applies generally to the bed portion of an ordinary automotive truck, said bed including a floor 4 along the side edges of which are arranged upstanding side walls, one of said side walls being indicated at 6. The bed is of course supported by ground-engaging wheels indicated at 8. The upper edge 10 of said side wall is generally smooth and horizontal, and the side edge 12 of floor 4 is generally a smooth, vertical surface.

The unloading device forming the subject matter of the present invention includes a tubular chute indicated generally by the numeral 14, and a supporting frame for said chute, said frame being indicated generally by the numeral 16. Frame 16 includes a pair of vertical, spaced apart parallel standards 18 adapted to extend above the upper edge of side wall 6, and having downward extensions 29 adapted to rest in slidable engagement with the inner surface of wall 6, as shown. Standards 18 are rigidly interconnected, adjacent their lower ends, by a horizontal cross bar 22. Affixed to each standard 18 is a horizontal arm 24, said arm extending at right angles to the vertical plane of the standards so as to project outwardly over the top edge of truck wall 6.

Disposed immediately beneath each arm 24 is a roller 26 rotatable on a horizontal axis parallel to said arm, being journaled on an axle 28 affixed at one end in the associated standard 18, and at its opposite end in a bracket 30 affixed to and depending from the associated arm 24. Rollers 26 rest on the top edge 10 of wall 6, whereby to support the weight of the frame.

Affixed to the outer end of each arm 24 is a depending bar 32, bars 32 being disposed in a vertical plane spaced outwardly from truck wall 6, and converging downwardly, being connected rigidly at their lower ends by a cross bar 34, and at an intermediate point by another cross bar 36. A vertical post 38 disposed midway between bars 32, and in the plane thereof, is affixed to the midpoints of cross bars 34 and 36, and extends downwardly from cross bar 34. Slidably mounted on the downwardly extended portion of post 38 is a bracket 40, which may be rigidly clamped at any desired position on said post by means of clamp bolt 42. Bracket 40 extends inwardly from post 38 toward the truck body, and at its inner end carries a roller 44 for rotation on a vertical axis, said roller having rolling contact with the vertical edge surface 12 of the truck bed floor, or any other smooth external surface of the truck body, such as the external surface of the side wall 6 if this surface is in fact smooth.

Chute 14 is carried by standards 18, and slopes outwardly and downwardly therefrom. Said chute is, of course, open at both ends, and includes an upper or mouth section 46 flaringly enlarged toward its upper end to provide a wide entry into which the truck contents may be easily shovelled or otherwise deposited, a cylindrical section 48 fixed to the lower end of section 46, and a cylindrical lower section 50 slidably telescoped over the lower end portion of section 48. The extreme lower end portion 52 of section 50 is angled downwardly as shown. Section 50 slides freely on section 48 to adjust the overall length of the chute, and is controlled by a flexible strand 54 secured to section 50 at 56, then threaded through an eye member 58 mounted on section 48 by a clamp ring 60, and having a series of knobs 62 affixed thereto in spaced relation therealong, said strand being adapted to be engaged in a notch 64 of a bracket 66 affixed to chute section 46 adjacent the mouth thereof. Notch 64 is too narrow to pass knobs 62. Therefore, an operator standing in the truck bed can, by freeing strand 54 from notch 64, and re-engaging it in said notch intermediate any selected pair of knobs 62, adjust the effective length of the chute.

The mouth end of the chute section 46 is stiffened by a reinforcing strip 68 applied around the periphery thereof. Affixed to said strip, at respectively opposite sides thereof, are a pair of threaded lugs 70, said lugs being engageable between standards 18. A bolt 72 extends through each of said standards, and is threaded into the associated lug 70, whereby the chute is supported for vertical pivotal movement. The two bolts 72 are of course coaxial. Each standard 18 is provided with a series of vertically spaced apart holes 74 into which bolts 72 may be inserted selectively, whereby the elevation of the chute mouth above the truck wall 6 may be adjusted to the user's convenience or preference.

The angle of inclination of the chute, and hence the elevation of the discharge end 52 thereof above the ground, may be adjusted by means of a turnbuckle 76 consisting of an elongated nut 78 pivoted at 80 to a reinforcing bar 82 affixed to the chute along the lower midline thereof, an oppositely threaded elongated nut 84 pivoted at 86 to post 38 of the frame, a screw 88 having its respective end portions oppositely threaded for engagement respectively in nuts 78 and 84, and a handwheel 90 fixed on said screw whereby said screw may be manually rotated. Turnbuckle pivots 80 and 86 are both parallel to chute pivots 72 but are spaced apart therefrom, whereby extension or retraction of the turnbuckle will pivot the chute upwardly or downwardly. This operation may also be performed by an operator standing in the truck bed.

Operation and use of the device is believed to be reasonably obvious. In many practical sizes it may easily be light enough to be handled by one man. It is applied to the truck bed simply by engaging the downward extensions 20 of standards 18 over the top edge of a side wall 6 of the truck, to engage the inner surface thereof, and can be detached simply by lifting it free of said side wall. It can be adjusted to trucks having side walls of different heights simply by loosening bolt 42 and moving bracket 40 vertically along post 38, so that roller 44 will be positioned properly to engage edge surface 12 of the truck bed floor, or perhaps a smooth portion of the exterior surface of side wall 6. When mounted as described, the weight of the chute urges standard extensions 20 outwardly against wall 6, and urges roller 44 against surface 12, so that the chute is firmly supported at all times. Rollers 26 and 44 of the frame permit the assembly to be moved easily to any point along the length of the truck bed, so that easy access to the chute may be had from any part of the truck bed. Nevertheless, standard extensions 20 have frictional rather than rolling contact with truck wall 6, and therefore provide some resistance to movement of the assembly along the wall, so that it will not be moved accidentally even if the truck is parked on a slope. Material may be fed into the chute in any suitable manner, such as by shovelling if the material is loose in the truck, or if the material is bagged, by opening the bags and dumping the material directly into the chute mouth. Changing the inclination of the chute by means of handwheel 90, and the length thereof by means of strand 54, both as previously described, permits the discharge end 52 of the chute to be positioned accurately above or even within the filling opening of the receptacle to which material is being transferred, such as the seed or fertilizer hoppers of automatic planting machines. This may be done by an operator standing in the truck bed, with no necessity that he dismount from the truck, and without requiring the extreme accuracy of moving and positioning of the truck which would otherwise be necessary.

While I have shown and described a specific embodiment of my invention, it will be readily apparent that many minor changes of structure and operation could be made without departing from the spirit of the invention as defined by the scope of the appended claim.

What I claim as new and desire to protect by Letters Patent is:

An unloading device for trucks having beds with upstanding side walls, said device comprising:
(a) a frame adapted to be engaged over the top edge of one of said side walls, said frame extending above said side wall and including rigid members depending adjacent the inner surface of said side wall and adapted to have frictional sliding engagement therewith,
(b) a pair of rollers carried by said frame for rotation on axes normal to the plane of said side wall whereby to have rolling contact with the upper edge of said side wall,
(c) a third roller carried for rotation on a vertical axis by a portion of said frame depending externally of said side wall whereby to have rolling contact with the outer surface of said side wall, said third roller being vertically adjustable with respect to said frame,
(d) an elongated chute consisting of upper and lower sections slidable longitudinally with respect to each other, said upper section being pivoted at its upper end to the portion of said frame extending above said side wall for vertical pivotal movement, said chute being inclined outwardly and downwardly whereby said lower chute section tends to be moved outwardly on said upper section by gravity whereby to lengthen said chute,
(e) means for adjusting the length of said chute consisting of a flexible strand attached to said lower chute section and a bracket member fixed to the upper end portion of said upper chute section, and in which selected points of the length of said strand may be releasably engaged, and
(f) a turnbuckle of adjustable length extending between said frame and said upper chute section and pivotally connected thereto at points distal from the pivotal axis of said chute, whereby the angle of inclination of said chute may be adjusted, said bracket and said turnbuckle being accessible to an operator positioned in said truck bed.

References Cited

UNITED STATES PATENTS

| | | | |
|---|---|---|---|
| 760,634 | 5/1904 | Lanpher | 193—5 |
| 854,249 | 5/1907 | Spurlin | 193—5 |
| 862,322 | 8/1907 | Elphinstone | 193—5 |
| 892,406 | 7/1908 | Converse | 193—5 |
| 1,157,010 | 10/1915 | Lee | 193—5 |
| 1,241,436 | 9/1917 | Peterson | 193—5 |
| 1,261,805 | 4/1918 | Graham | 193—5 |
| 1,308,950 | 7/1919 | Heltzel | 193—5 X |
| 1,463,232 | 7/1923 | Trimmer | 193—5 |
| 1,626,122 | 4/1927 | Smith | 193—5 |
| 2,764,450 | 9/1956 | Rosener | 193—5 X |

EVON C. BLUNK, *Primary Examiner.*

M. L. AJEMAN, *Assistant Examiner.*